Patented Mar. 21, 1933

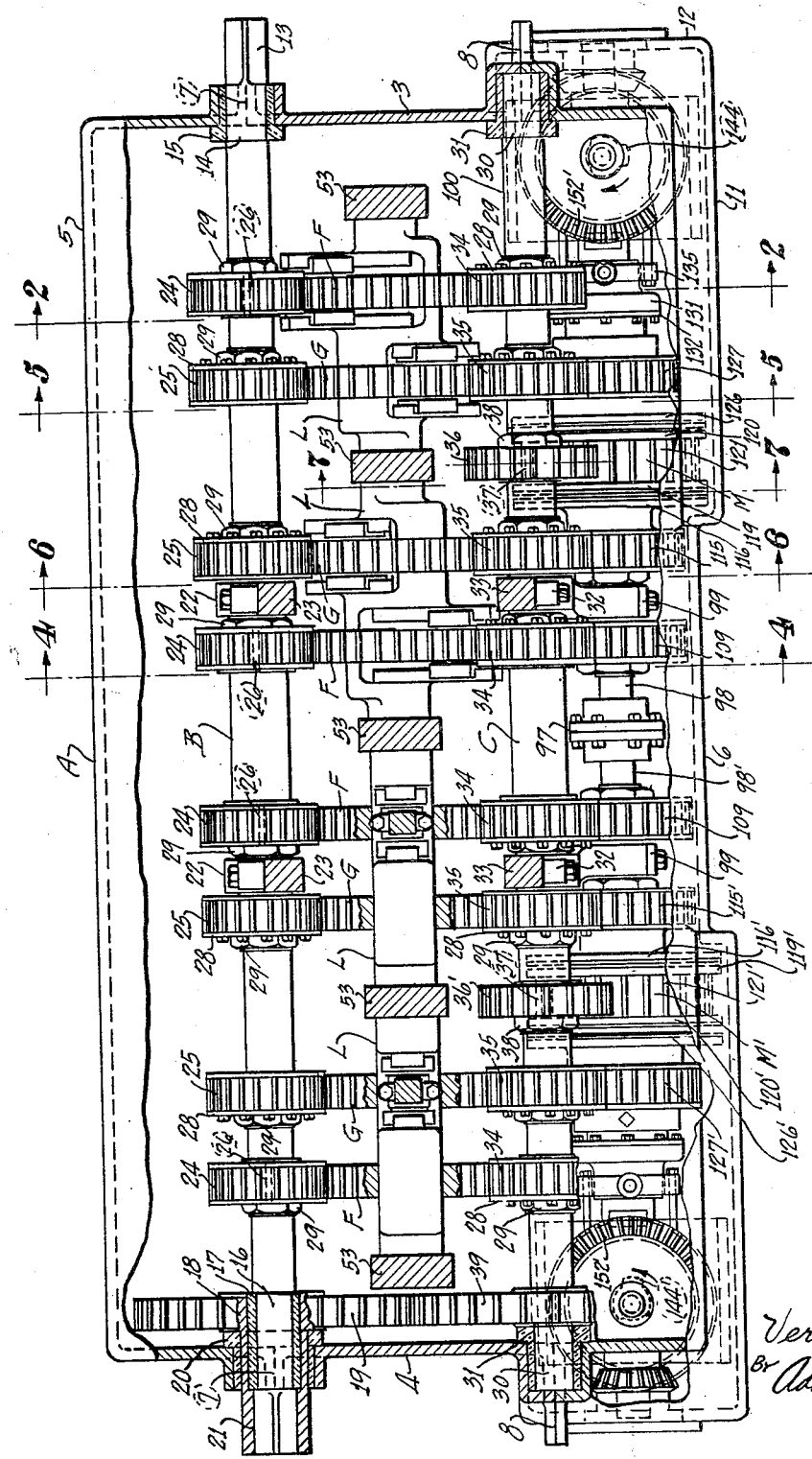

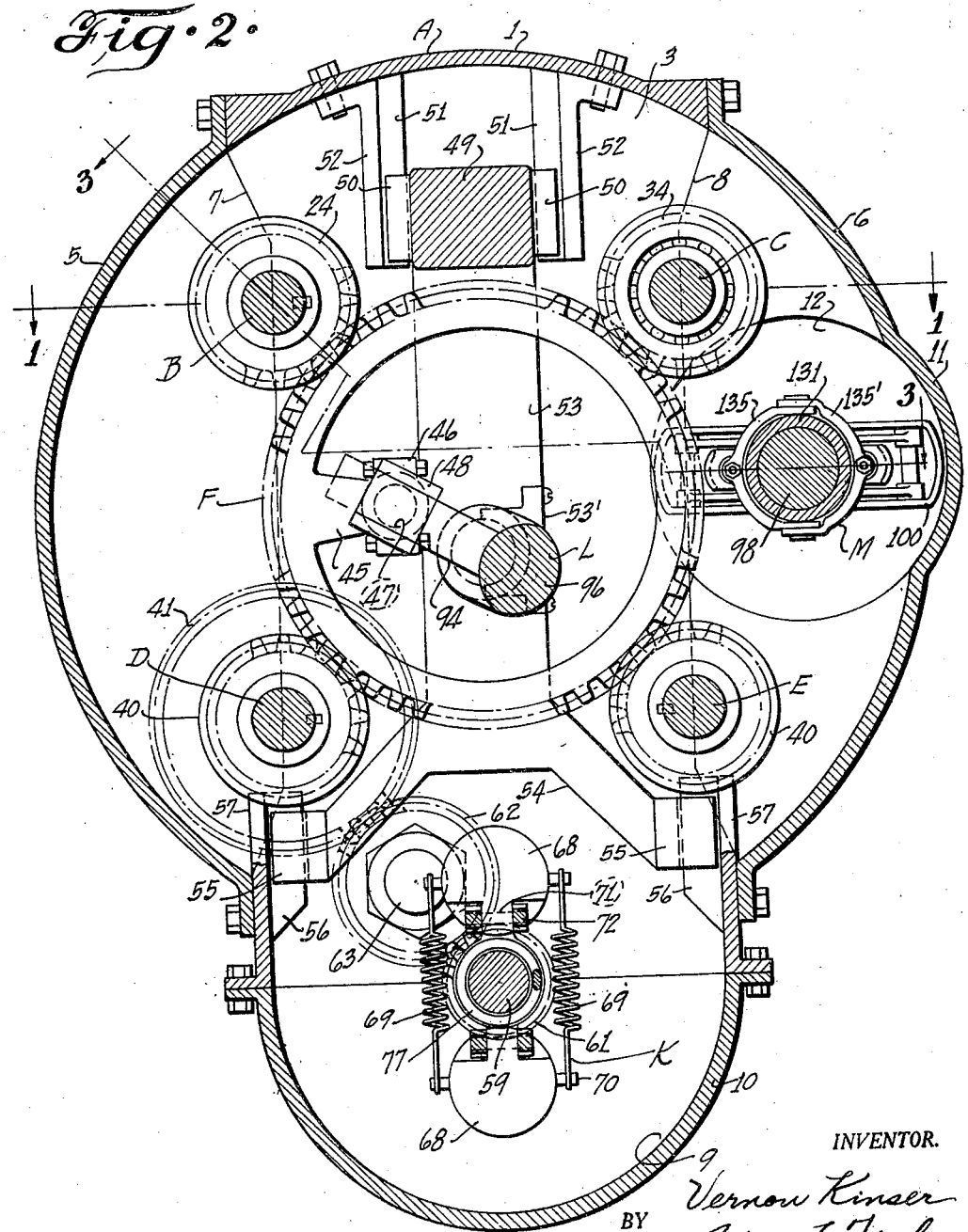

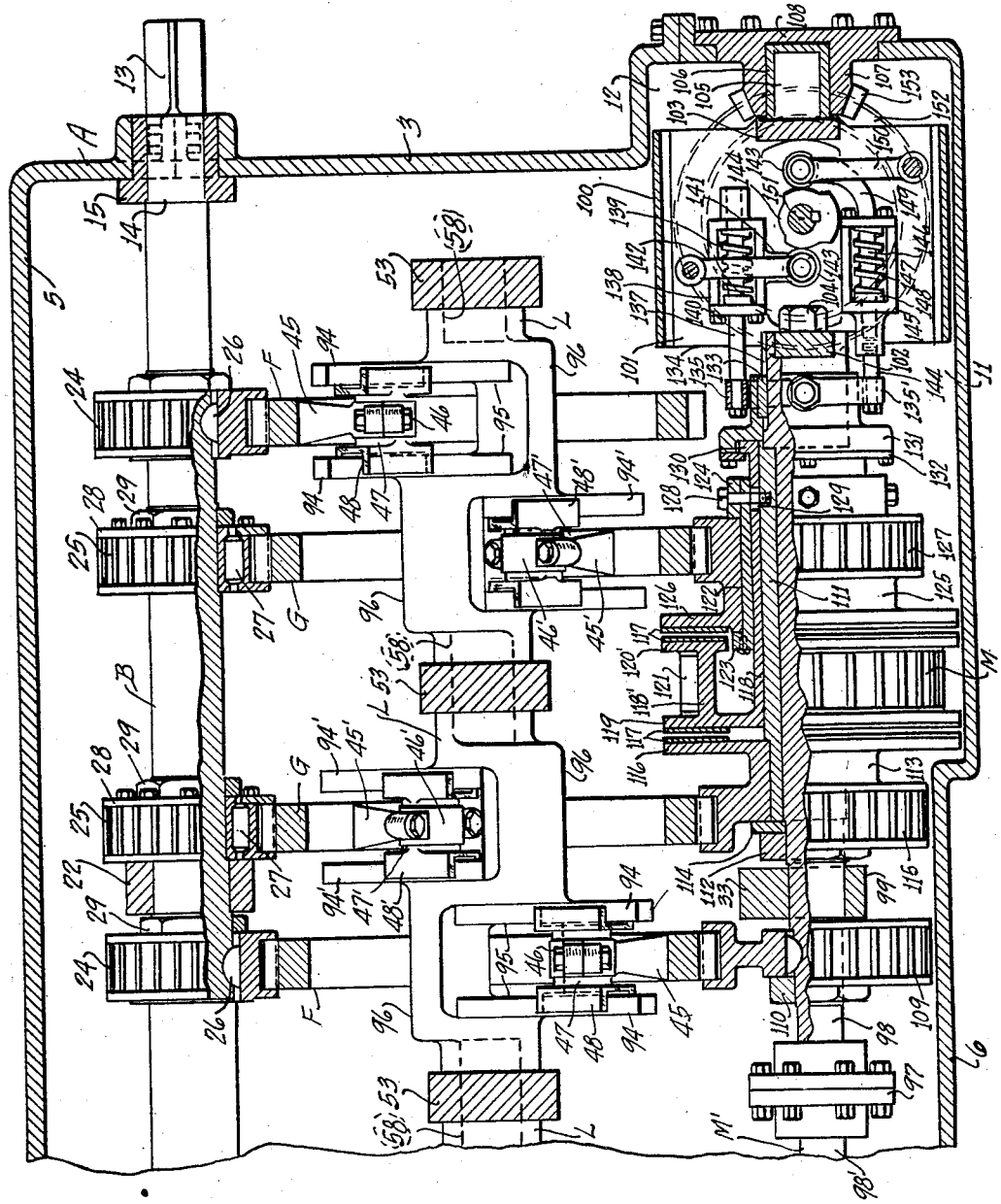

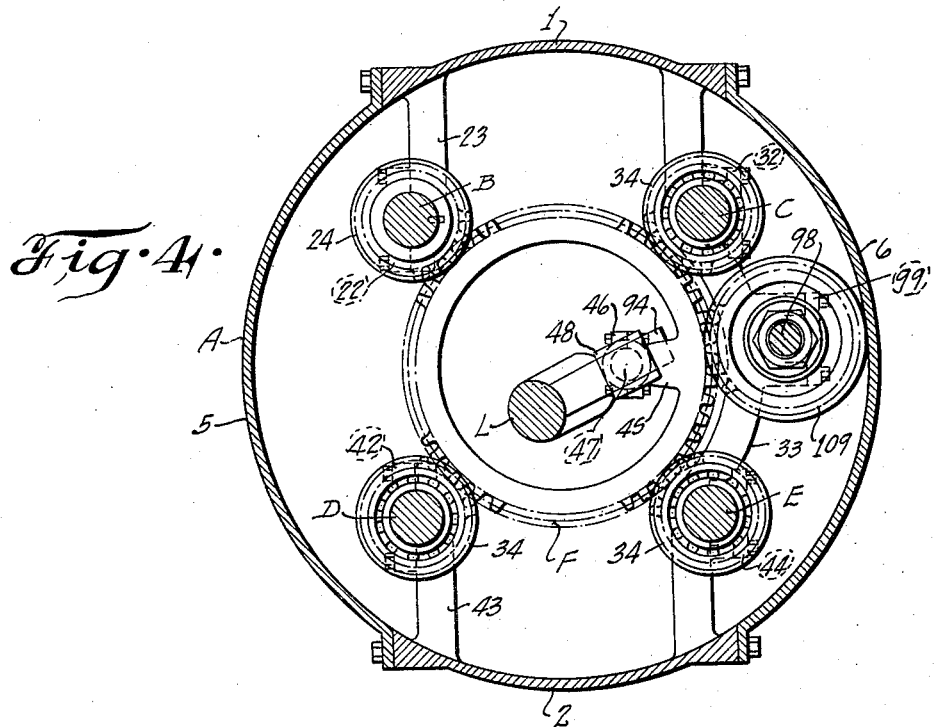
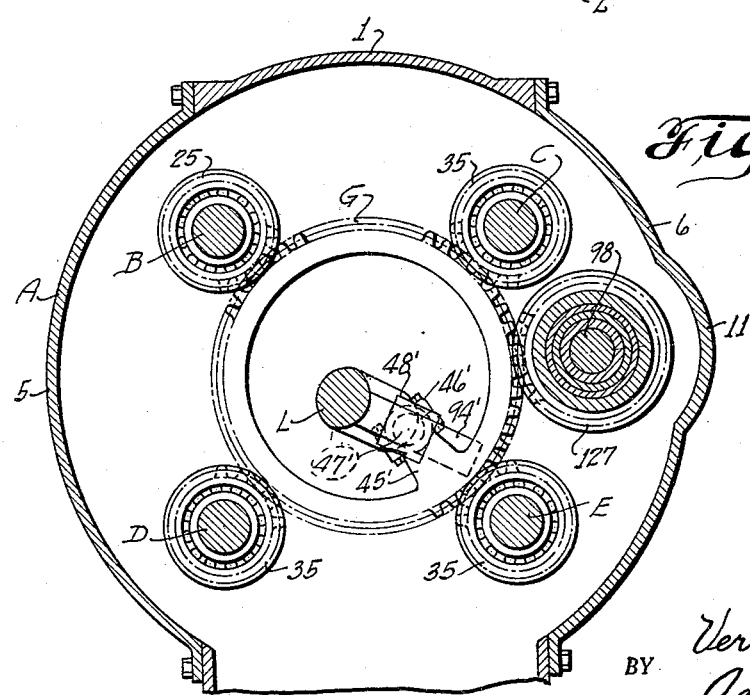

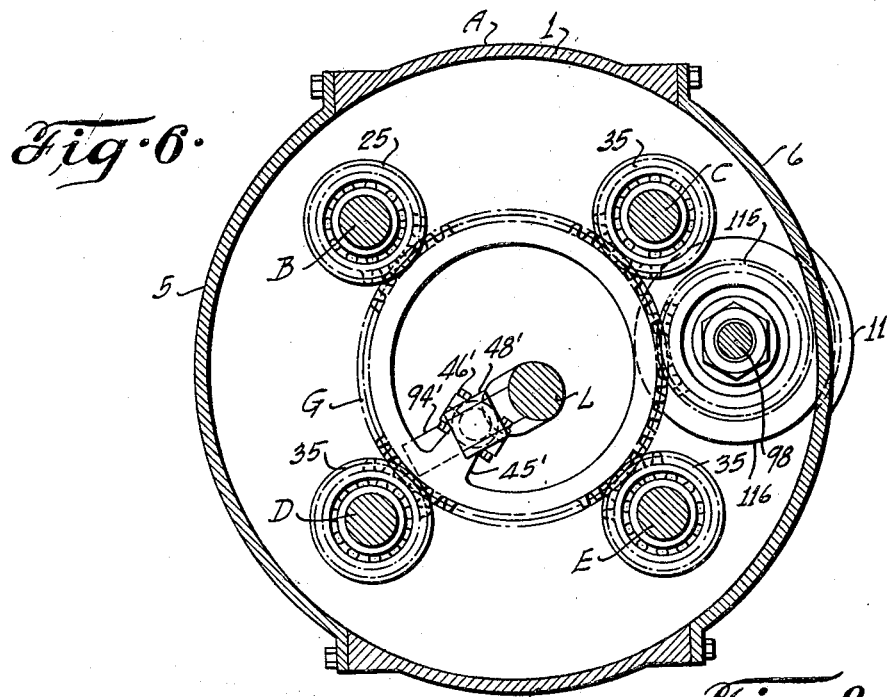
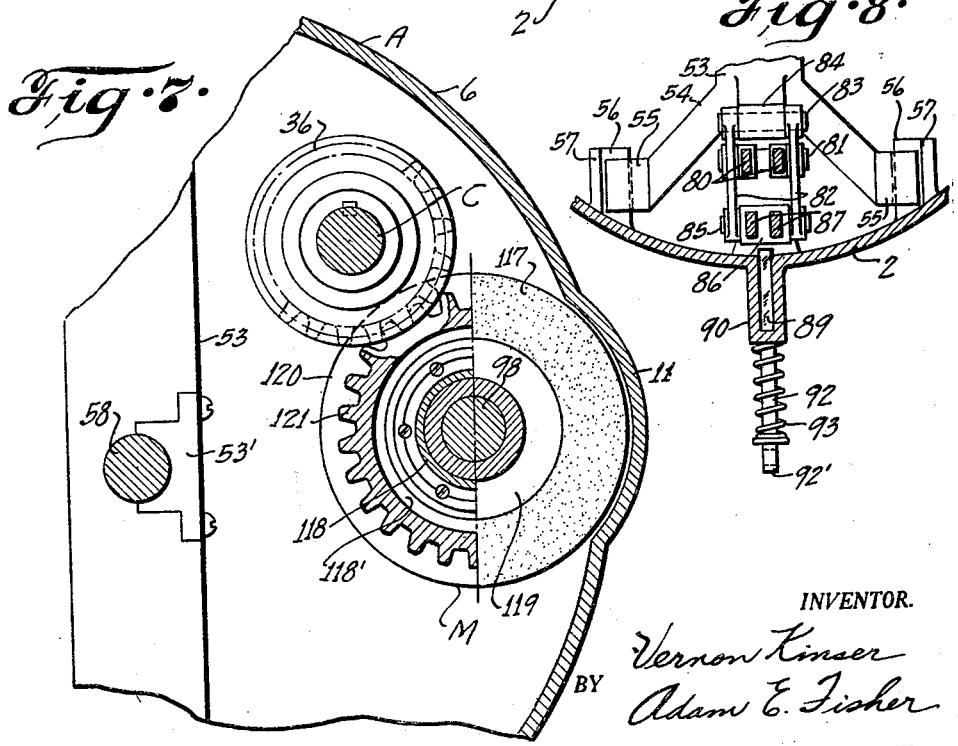

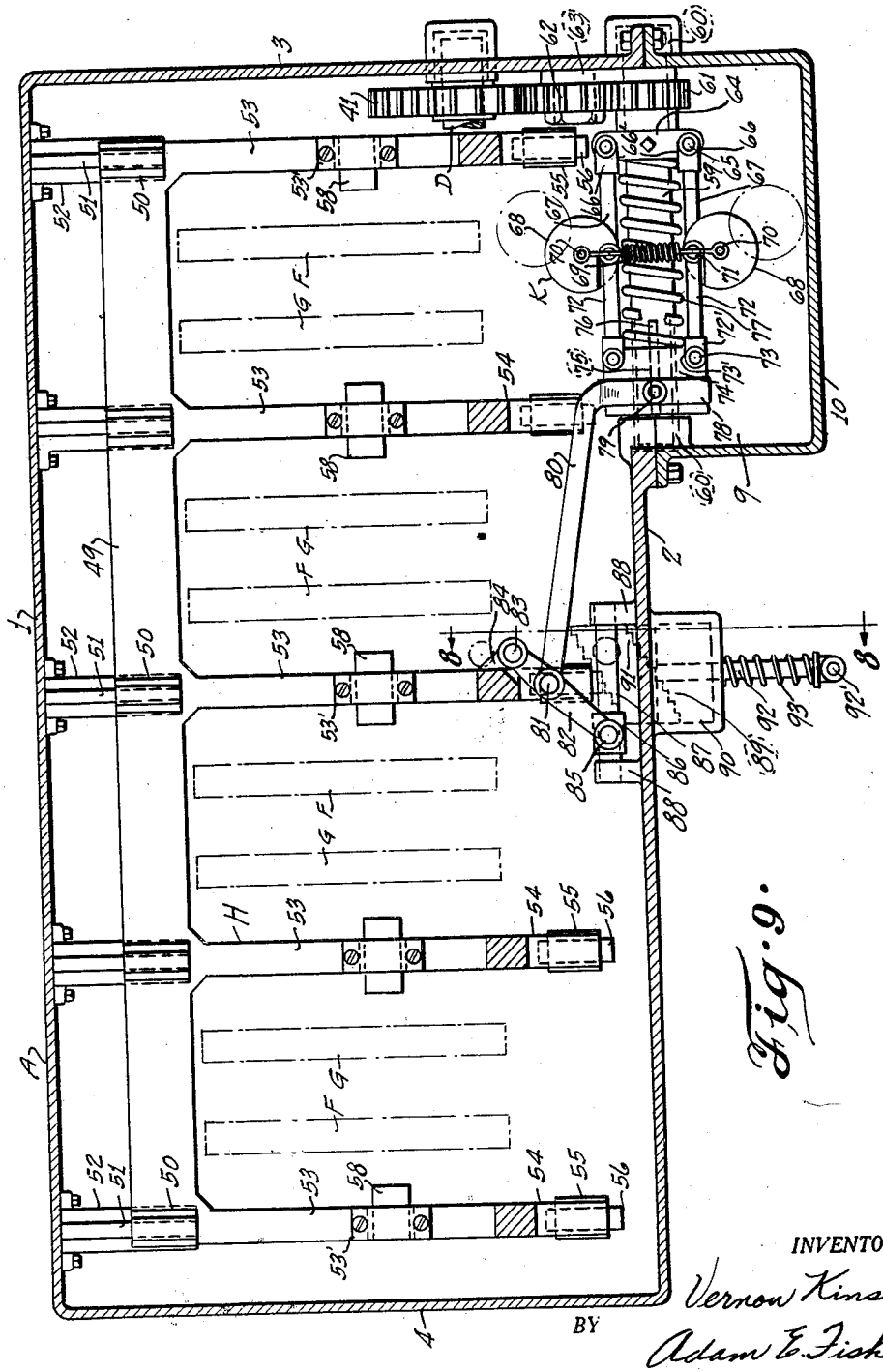

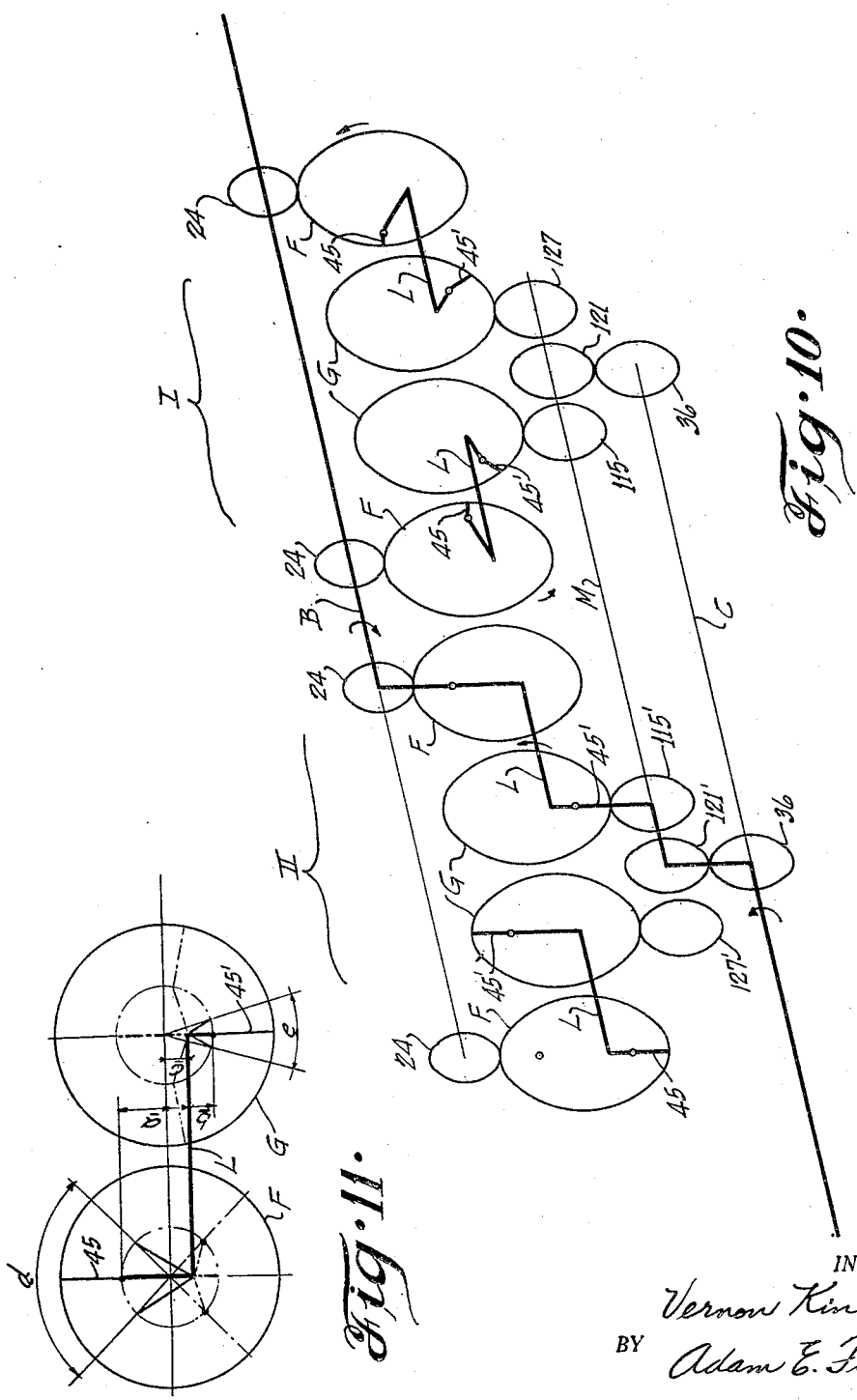

1,902,245

UNITED STATES PATENT OFFICE

VERNON KINSER, OF BUTTERFIELD, MISSOURI

AUTOMATIC TRANSMISSION

Application filed September 8, 1931. Serial No. 561,515.

This invention relates generally to speed changing apparatus and has more particular reference to a speed responsive transmission apparatus adapted especially, though not exclusively, for use as a transmission mechanism in automotive vehicles.

My invention has for its prime objects the provision of a speed responsive transmission device having automatically operable continuously variable speed-changing characteristics; the provision of such a transmission device operable for speed changing purposes between predetermined limits; the provision of a transmission device cooperable with driving and driven members for effecting speed regulation therebetween responsively to actuation of the driving member; the provision of a transmission mechanism for automotive vehicles responsive to engine speed independently of engine power output; the provision of an automatic speed changing apparatus incorporating means for rendering the speed changing mechanism inoperative; the provision of an automatic speed changing apparatus normally operable by low speed engagement of its cooperating elements; the provision of a speed transmission device incorporating driving and driven rotatory elements and means providing variable leverage arm connections therebetween for speed reducing purposes; the provision of a speed transmission device incorporating a driven member and elements having variable rotatory speed and means for intermittently connecting said elements with the driven member; and to generally improve the construction of speed transmission mechanisms and the operation and use of automotive vehicle employing such improved mechanism.

With the above and other objects in view, my invention resides in the novel features of form, construction, arrangement and combination of parts hereinafter described and pointed out in the claims.

In the accompanying drawings

Figure 1 is a sectional plan view of an automatic speed changing apparatus of my invention, the view being taken approximately along the line 1—1 of Figure 2.

Figure 2 is an enlarged transversely vertical sectional view taken approximately along the line 2—2 of Figure 1, showing the front driving ring gear of the forward group thereof.

Figure 3 is an enlarged longitudinally vertical sectional view taken approximately along the line 3—3 of Figure 2, showing the forward group of ring gears, the rear half of the apparatus being broken away.

Figure 4 is a transversely vertical sectional view taken approximately along the line 4—4 of Figure 1, showing the rear driving ring gear of the forward group thereof.

Figure 5 is a transversely vertical sectional view taken approximately along the line 5—5 of Figure 1, showing the front driven ring gear cooperating with the ring gear of Figure 2.

Figure 6 is a vertically transverse sectional view taken approximately along the line 6—6 of Figure 1, showing the rear driven ring gear cooperating with the ring gear of Figure 4.

Figure 7 is a fragmentary enlarged sectional view of one of the clutch drives and its meshing driven shaft gear, the view being taken approximately along the line 7—7 of Figure 3.

Figure 8 is a fragmentary vertically sectional view of a portion of the automatic frame shifting mechanism showing the selectively shiftable stop member thereof.

Figure 9 is a longitudinally vertical sectional view of the apparatus, showing the housing with the shiftable frame therein and governor actuated shifting mechanism thereof, the ring gears being merely indicated by dot-dash lines and other parts of the apparatus removed.

Figure 10 is a diagrammatic perspective view of the principal speed transmission elements of the device, illustrating the manner of cooperation thereof at a particular moment of operation corresponding to the several views in the drawings.

Figure 11 is a diagrammatic view of a pair of driving and driven ring gears illustrating the manner of cooperation thereof at maximum leverage ratio, their reverse or opposite positions being indicated by dot-dash lines.

Referring now more in detail and by reference characters to the drawings, which illustrate a preferred embodiment of the invention, A designates a housing adapted to be mounted by means not shown, on the chassis of an automotive vehicle, the housing A preferably having a generally cylindrical shape, and including a central frame or body member having a top wall 1, bottom wall 2 and opposed end walls 3 and 4, to which is oppositely attached removable housing side walls 5 and 6, the latter most conveniently being detachable from the housing body member at parting lines 7 and 8 respectively. At one end of the housing A the bottom wall 2 is provided with a depending pocket 9 having a lower, preferably semi-cylindrical removable section 10 (Figure 9) and provided in the opposite ends of the side wall 6 are lateral pockets 11 merging into generally cylindrical pockets 12 incorporated in and with the side wall section for projecting suitably beyond the housing end walls 3 and 4, respectively (Figure 1), all for a purpose presently appearing.

Having preferably a squared end 13 projecting endwise from the housing wall 3 for suitable connection with a prime mover, as an automotive engine or the like, (not shown) is a driving shaft B, having its front end suitably reduced as at 14 and journaled preferably in a bushing 15 supported between the cooperating housing walls 3 and 5, at the parting line 7. The rear end of the shaft B is also reduced as at 16 and journaled in a bushing 17 carried in the hub 18 of a quill gear 19, the latter being in turn journaled in a bushing 20 supported between the cooperating housing walls 4 and 5 at the parting line 8. The hub 18 preferably is extended endwise through the bushing 20 providing a squared socket 21 projecting from the housing for suitable connection with the operating member (not shown) of the mechanism to be driven, as for example, an automotive rear axle or the like. The shaft B is intermediately supported in spaced bearings 22 provided on brackets 23 depending from the housing top wall 1, as best seen in Figure 4.

Mounted on the shaft B are a plurality of suitably shrouded gears or pinions arranged in groups each composed of a pair of suitably spaced driving pinions 24 fixed on the shaft B, and intermediately thereof, a pair of spaced idling pinions 25, the pinions 24 being suitably keyed as at 26 to the shaft B and the pinions 25 journaled thereon as by roller bearings 27 equipped with a retainer ring 28 mounted on the pinion body as shown. The pinions 24 and 25 are assembled on the shaft B from the opposite ends thereof towards its center, and are engaged between the shoulders of suitably shaft provided pinion seats and nuts 29 threaded thereon, as best seen in Figure 3.

Spaced from and preferably horizontally parallel with the shaft B is a driven shaft C, having its opposite ends suitably reduced as at 30 and journaled in bushings 31 supported in and between the housing walls 3 and 6, and 4 and 6 respectively, at the housing parting lines 8, the shaft C being intermediately supported by bearings 32 provided in suitable vertical frame members or curved posts 33 extending between and supported by the housing walls 1 and 2 oppositely the bearings 22, as best seen in Figure 4.

Journaled on the shaft C are shrouded idling pinions or gears 34 and 35, disposed in presently appearing cooperative transverse alignment with the pinions 24 and 25, respectively, of the shaft B, the pinions 34 and 35 being equipped similarly to the pinions 25, with roller bearings including retainer rings 28, and being assembled on the shaft C from the opposite ends thereof toward its center for engagement between the shoulders of suitable shaft provided pinion seats and nuts 29 threaded thereon (Figure 1). Intermediately each pair of the pinions 35 are front and rear gears 36 and 36' respectively, fixed on the shaft C as by suitable keys 37, the gears 36 and 36' being mounted on shaft provided pinion seats for engagement between the shoulders thereof and nuts 38 threaded thereto. Additionally, adjacent the housing end wall 4, is a gear 39 fixed on the shaft C for meshing engagement with and actuation of the aforesaid quill gear 19, the gears 19 and 39 cooperatively rotating in suitable wall provided pockets (not shown) in the upper portions of the housing A.

Vertically spaced from and parallel with the shaft B is a governor drive shaft D, having a series of idling pinions 34 and 35 journaled thereon in alignment with and in form and function similar to the like pinions 34 and 35 of the shaft C, hence further description thereof is omitted; however, for effecting rotatory actuation of the shaft D, preferably the forward one of the series of pinions is fixed to the shaft D, as indicated at 40 in Figure 2. Additionally, adjacent the housing end wall 3, is a gear 41 fixed on the shaft D for a purpose soon appearing. The shaft D is supported at its opposite ends by means substantially similar to those of the shaft C, merely the end of the shaft D carrying the gear 41 being shown in Figure 9. The shaft D is also intermediately supported in bearings 42 provided on brackets 43 upstanding from the lower housing wall 2 preferably in vertical alignment with the bearings 22 of the shaft B, as best seen in Figure 4.

Vertically spaced from and parallel with the shaft C and likewise horizontally spaced from and preferably parallel with the shaft D is an idler-shaft E having idling pinions 34 and 35, and fixed pinion 40, all substantially similar in form and function to those of the shaft D, hence further description thereof is omitted; however, the gear 41 of the shaft D is omitted from the shaft E, as will be understood from Figure 2. The shaft E is supported at its ends by means (not shown) similar to those supporting the shaft C, and is intermediately supported in bearings 44 provided in the frame posts 33, as best seen in Figure 4.

Longitudinally spaced in the housing A are a plurality or series of axially aligned hollow or annular rotatory elements or ring gears F and G, arranged in groups each composed of two members F and two members G, and hereinafter designated as a front group I and a rear group II, as best seen in Figure 10. Each group I and II, comprises a pair of spaced driving gears F respectively meshing with, for actuation by, the corresponding pinions 24 of the shaft B, the gears F being also rotatively supported, meshingly between the said pinions 24 and the pinions 34 of the shafts C, D and E, the shrouds of the pinions most efficiently retaining the gears F against axial displacement in the housing, as best seen in Figures 1 and 4, it being borne in mind, however, that the forward gear F of the front group I has shaft actuating meshing engagement with the fixed pinions 40 of the shafts D and E as shown in Figure 2.

Projecting radially inward from the rim of each gear F is an arm 45 carrying at its end a bearing 46 in which is journaled a crosshead 47 having opposed shoes 48, for a purpose presently appearing. The gears F of each group I, or II, as the case may be, mesh with the respective pinions 24 for disposing the arms 45 circumferentially 180 degrees apart, the arms 45 of the gears F of the front group I being 90 degrees in advance of or in quadrature with, the arms 45 of the corresponding gears F of the rear group II, as best seen in Figure 10. Intermediately each pair of gears F is a pair of substantially similarly spaced driven gears G also having arms 45', bearings 46', cross heads 47' and shoes 48'. The gears G mesh with and are revolvingly supported between and retained against lateral displacement by the shrouds of the correspondingly aligned sets of idler pinions 25 and 35 of the shafts B, C, D and E (Figure 5), for the cooperation of each gear G with its adjacent gear F, the gears G during operation of the mechanism taking rotatory positions having angular variation with respect to the gears F as presently appearing.

Reciprocable in the vertical median plane of the housing A, as best seen in Figure 9, is a shifting frame H, including a longitudinal member or bridging bar 49 disposed in the upper portion of the housing above the ring gears F and G, the bar 49 carrying opposed shoes 50 engaging ways 51 provided on suitably spaced brackets 52 detachably depending from the upper housing wall 1. Depending from the member 49 are a series of substantially similar vertical bars 53, suitably longitudinally spaced in the housing for embracing each cooperating pair of gears F and G, as best seen in Figure 9. The lower ends of the bars 53 are bifurcated for providing laterally spaced arms 54 carrying shoes 55 engaging ways 56 provided on substantially similar transversely spaced pairs of brackets 57 upstanding from the housing wall 2. Suitably removably mounted intermediately in the bars 53 by means of detachable bar carried caps 53' are substantially similar fulcrum pins 58, the several pins 58 being axially aligned longitudinally in the housing for shiftable movement in the vertical plane of the axis of revolution of the ring gears F and G, responsive to reciprocation of the frame H. Such reciprocation of the frame H and its carried pins 58 is automatically effected by a governor mechanism K responsive to speed variations of the driving elements F and preferably disposed in the lower housing pocket 9, said mechanism K including a shaft 59 journaled in bushings 60 carried in the respective pocket end walls by and between the cooperating housing wall 2 and detachable lower pocket wall 10.

Adjacent the housing front wall 3 is a pinion 61 fixed on the shaft 59 for meshing with an idler gear 62 rotatively mounted on a stub-shaft 63 supported from the housing wall 3, the gear 62 meshing with, for actuation of the governor shaft 59 by, the gear 41 of the shaft D. Preferably abutting the hub of the pinion 61 and mounted on, for rotation with, the shaft 59, is a collar 64. Pivotally connected as at 65 to opposite sides of the collar 64 is a pair of suitable yokes 66 swingable in, for normally edge wise impinging upon the bottom wall of corresponding opposed yoke receptive pockets 66' provided in the collar 64, for limiting the shaft inward swinging actuation of the yokes 66.

From the yokes 66 extend arms 67 parallel with the shaft 59 and carrying opposed balls or governor weights 68 for centrifugal actuation thereof swingably in the diametrical plane of and oppositely outwardly from the shaft 59, the weights 68 being yieldingly connected for normally residing adjacent the shaft 59, by a pair of springs or like tensional members 69 supported by and between suitable pins 70 projecting from the weights 68.

Housed endwise in suitable pockets provided in and pivotally connected as at 71 to the weights 68 are pairs of links 72 rearwardly extending parallel with the weight arms 67 for pivotal connection as at 73 with a sleeve 74 reciprocably mounted on the shaft 59, the sleeve 74 having splines 75 working in corresponding shaft provided ways 76 for rotation of the sleeve with the shaft, the splines 75 being adapted for endwise impinging upon the opposite ends of the ways 76 for limiting the movement of the sleeve 74 on the shaft 59.

The sleeve engaging ends of the links 72 are preferably provided with hubs 72' adapted normally for edgewise impinging upon the bottom walls of suitable link pockets 73' provided in the sleeve 74 for limiting the shaft inward swinging movement of the links 72, and it may here be pointed out that, when the links 67 and 72 are in their normal inward limited position, the respective series of pivots 66, 71 and 73 are aligned in toggle locking manner for a purpose presently appearing.

For resisting centrifugal force at the more widely extended positions of the weights 68 is a coil spring or compressively yieldable member 77 axially mounted on the shaft 59 for engagement between the opposing faces of the collar 64 and sleeve 74.

Slidably mounted in a suitable groove provided in the sleeve body 74 is a collar 78 having diametrically opposed pins 79 pivotally engaged by the bifurcated or yoked end of a link 80 extending rearwardly toward the center of the housing A for pivotal connection as at 81 intermediately with and between a pair of vertically oscillatable levers 82, having their upper ends pivotally connected as at 83 to a bracket 84 forwardly projecting from the central vertical bar 53 of the shifting frame H. The lower ends of the levers 82 have pivotal connection as at 85 with a shoe or slide 86 reciprocally engaging a transversely spaced pair of horizontal guide bars 87 supported by suitable brackets 88 upstanding from the bottom housing wall 2.

The several parts are disposed so that when the governor weights 68 are in normally collapsed position, the sleeve 74 is disposed for swingingly actuating the levers 82 for shifting the lever connected shoe 86 horizontally on the guides 87 for correspondingly inclining the levers 82 rearwardly under the bifurcated end of the vertically shiftable frame bar 53, for drawing the frame H downwardly in the housing until the frame-carried fulcrum pins 58 have the desired maximum eccentricity with respect to the center of revolution of the ring gears F and G. Conversely, when the governor weights 68 are widely swung apart as indicated by dot-dash lines in Figure 9, the sleeve 74 is forwardly shifted on the shaft 59 for impinging upon the splines 75 with the ends of the shaft ways 76, the shoe 86 being correspondingly shifted on the guides 87 for disposing the levers 82 in upright position for shifting the frame H upwardly in the housing A, until the fulcrum pins 58 are co-axial with the center of revolution of the ring gears F and G, and it may here be pointed out that at such time the levers 82 rest in toggle locking manner right angularly to the axis of the guides 87. It will hence be seen that the frame H is locked in shifted position at both the extreme shaft inward and shaft outward positions of the governor weights 68, corresponding, as will presently appear, to so called low speed and high speed positions, respectively, of the transmission mechanism.

The frame H also may be selectively locked against upward shifting movement toward high speed position by means of a stop plate or member 89, reciprocally mounted in a suitable pocket 90, depending from the lower housing wall 2, for shiftable projection therefrom between and through the guide bars 87 into the path of the shoe 86, the stop 89 having a serrated edge providing a forwardly ascending series of steps 90 adapted for impingement by the shoe 86 on forward frame lifting movement thereof at positions corresponding to the upward projection of the stop 89 obstructingly thereto.

Preferably the stop 89 is provided with a plunger 92 depending through the bottom wall of the pocket 90 and carrying at its exterior end an eye 92' or other suitable means for connection with a manually operable plunger shifting device (not shown), a coil spring or like tensional member 93 being mounted on the plunger 92 between the eye 92' and the pocket bottom wall for normally retracting the stop 89 inoperatively into the pocket 90.

Disposed between each pair of bars 53 for rotary support on and by their pins 58, is a plurality of intermediate rotatory members or fulcrum shafts L adapted for independent rotation and responsive respectively to the revolution of, and disposed in and between for cooperation with the corresponding pair of ring gears F and G, as best seen in Figure 1, the axis of rotation of the shafts L being hence movable in the diametrical plane of the gears F, G, with and on actuation of the shifting frame H from depressed low speed position eccentric to the center of revolution of the ring gears F and G, to elevated high speed position concentric with the center of revolution of said ring gears F and G, as will presently appear.

Each fulcrum shaft L is provided with diametrically disposed, aligned and axially spaced pairs of radial lever arms 94 and 94', aligned with the ring gears F and G, respectively, each pair of arms 94 and 94' providing ways 95 therebetween preferably extending through the shaft centers and connected by suitable counter weight members 96 forming part of the shaft structure. The arms 94 are disposed for cooperative sliding engagement of their ways 95 with the corresponding shoes 48 of the cross head 47 pivotally connected to the ring gear F, and in similar but opposite manner the arms 94' cooperate with the shoes 48' of the cross head 47 pivotally connected to the ring gear G, for providing, as may be said, a rotary lever permanently operatively connecting the particular pair of the ring gears F and G, at continuously variable radius arms with respect to the common center of revolution of the gears F and G and having a leverage ratio proportional to the eccentricity of the center of revolution of the fulcrum shaft L with respect to that of the gears, F, G.

The speed reducing capacity of any particular pair of the lever arms 94 and 94', is zero, or at 1:1 ratio, at high speed position of the frame H when the fulcrum pins 58 are coaxial with the center of revolution of the ring gears F and G, and is at a maximum ratio when the frame H is at low speed position and the arms 94 and 94' are disposed in the plane of movement of the shiftable arm supporting shaft L, as shown by solid lines in Figure 11, the arms 94 then engaging cross head 47 of the driving gear F at maximum distance from the center of the shaft L, as designated at $a$ in Figure 11, and the arms 94' engaging the cross head 47' of the driven gear F' at complementary minimum distance from the center of the shaft L, as designated at $b$ in Figure 11, such relative leverage arms being dependent upon the eccentricity of the shaft L, as designated at $c$ in Figure 11. In the present instance the maximum proportionality $a:b$ is at the ratio of 3:1, and at the particular moment shown in the drawings is obtained by the front pair of gears F and G of the rearward group II thereof, as best seen in Figure 1 and diagrammatically also illustrated in Figure 10.

Inasmuch as the shaft L must revolve, however, a complete revolution on each revolution of the driving gear F, it follows that the driven gear G will also accomplish a complete or concurrent revolution in like period of time but at a continuously variable angular velocity or rotatory speed having its maximum when the cross head 47 of the gear F engages the shaft arms 94 at minimum distance from the shaft center with the shaft arms 94' engaging the cross head 47' of the gear G at complementary maximum distance therefrom as shown by dot-dash lines in Figure 11, the proportionality being then at the ratio of 1:3.

In practice I have found that the such speed variation of the driven gear G is of substantially negligible effect during angular movement of the driving gear F of 45 degrees each side of its described maximum leverage position, hence during an arc of movement of 90 degrees of the gear F, that is, the quadrant of revolution of the gear F that is bisected by the plane of center shifting movement of the shaft L, as designated at $d$ in Figure 11, the desired ratio of movement of the gear G will be substantially maintained, that is to say, the latter will at maximum ratio of 3:1, have an angular movement of approximately 30 degrees, more or less, as designated at $e$ in Figure 11. I take advantage of this fact by intermittently connecting the driven gears G successively with the driven shaft C during the said 90 degree period of maximum leverage rotation of the respective driving gears F by means of suitably timed clutching mechanisms, M and M', now to be described.

Such mechanisms M and M' are preferably mounted on a supplemental rotatory supporting member disposed between the shafts C and E, for support in the housing as presently appearing, said member being preferably composed of a pair of symmetrically equipped but reversely arranged sections connected at the center of the housing by a coupling 97, and hereinafter, for reasons presently appearing, designated as the clutch timing shafts 98 and 98', respectively, the front shaft 98 and its carried mechanism M being associated with the forward group I of ring gears F and G, and the rear shaft 98' and its carried mechanism M' being associated with the rearward group II thereof. Adjacent the coupling 97, the shafts 98 and 98' are journaled in respective bearings 99 provided intermediately in the frame posts 33, and the respective opposite ends of the shafts 98 and 98' terminate in yokes or frames 100 each including spaced side plates 101 connected by suitable axially spaced transverse end bars 102 and 103, the bar 102 being bolted as at 104 to the shaft 98 and the bar 103 carrying a stub shaft 105 rotatively mounted in a bushing 106 supported in a hub 107 inwardly projecting from a plate 108 removably mounted in and through the adjacent end wall of the particular pocket 12. The shafts 98 and 98' are driven by means of respective pinions 109 disposed between the coupling 97 and bearings 99 and fixed to the shafts 98 or 98' for engagement between the shoulders of suitable shaft provided pinion seats and nuts 110 threaded thereto, the pinions 109 having meshing engagement respectively with the centrally adjacent pair of ring gears F at a ratio of two revolutions of the shafts 98 and 98', to one revolution of the ring gears F.

The mechanism M, proper, includes an elongated bushing 111 mounted on the shaft 98 for engagement between the forward shoulder of a suitable shaft provided bushing seat and a rearward nut 112 threaded thereto. At its rear end the bushing 111 is provided with a reduced portion on which is journaled a quill 113 engaged between a shoulder on the bushing and a retainer ring 114 interposed between the nut 112 and bushing 111, the quill 113 at its rear end carrying a gear 115 meshing with the rearward gear G, and at its front end carrying a clutch driving disc 116 provided with a suitable friction facing 117.

Journaled for rotation and axially shiftable movement on the front portion of the bushing 111 is a sleeve 118 carrying a clutch drum 118′ having axially spaced oppositely presented clutch driven discs 119 and 120, respectively, also provided with friction facings 117, the drum 118′, intermediately said discs, being formed with a circumferential series of teeth providing a wide-faced gear 121 adapted for axially shiftable meshing engagement with the particular gear 36 of the superimposed shaft C for actuation thereof responsively to clutch engaging actuation of the clutch drum 118′ as presently appearing.

Journaled on the forward portion of the sleeve 118 is a bushing 122 having at its opposite ends suitable detachably mounted rearward and forward retainer rings 123 and 124, respectively, between which is journaled on the bushing 122 a quill 125. At its rear end the quill 125 carries a clutch driving disc 126 also having a friction facing 117 and at its forward end the quill 125 carries a gear 127 meshing with the forward ring gear G.

Mounted radially through the forward retainer ring 124 and bushing 122 is a plurality of studs 128 working in longitudinal slots 129, provided in the clutch sleeve 118, for threadedly engaging the underlying bushing 111, by which construction the bushing 122 and its carried quill 125 is retained against axial displacement on the shaft 98, the slots 129 however, providing for longitudinally shifting movement of the sleeve 118 between the bushings 111 and 122, for engaging or disengaging the drum clutch discs 119 with and from the rear pinion clutch discs 116, and alternately therewith engaging or disengaging the drum clutch disc 120 with and from the front pinion clutch discs 126. For such purpose the sleeve 118 is provided at its forward end with a collar or annular flange 130, rotatively engaged between the walls of a socket member 131 and an annular retaining ring 132 detachably secured thereto, the hub of the socket member 131 being mounted longitudinally shiftably on and having a key or keys 133 slidably engaging ways 134 provided in the suitably enlarged front end of the shaft 98 adjacent the frame 100 thereof.

Respectively oppositely embracing the hub of the socket member 131 is a pair of semicircular yokes 135 and 135′ pivotally engaging diametrically disposed studs 136 projecting from the sides of the socket hub. One of the yokes, as 135, carries a forwardly projecting plunger rod 137 reciprocable in and through a spring frame 138 disposed between the side plates 101 of the frame 100, the plunger 137 carrying a coil spring or like compression member 139 engaged between a plunger provided collar 140 and the front end of the frame 138 for normally yieldingly impinging the collar 140 with the rear end of the frame. From the frame 138 shaft-wise depends a preferably bifurcated arm 141 having pivotal connection with radial links 142 in turn pivotally suspended from and between the side plates 101 for embracing the frame 138, the arm 141 also rotatively supporting a roller 143 disposed preferably at the shaft axis for rolling engagement with a frame supported rotatory clutch timing cam 144, presently to be described.

The other socket carried yoke 135′ carries a stud or rod 144 threaded endwise in a spring frame 145, disposed between the side plates 101 oppositely the spring frame 138, for reciprocally supporting a plunger 146 carrying a spring 147 engaged between a collar 148 and the front end of the frame 145 for normally yieldingly impinging the collar 148 on the rear end of the frame. The plunger 146 shiftably projects forwardly from the frame 145 and terminates in an upwardly curved arm 149 having pivotal connection with similar radial links 150 in turn pivotally supported from and between the side plate 101, for embracing the arm 149, the latter also rotatively supporting a roller 143 disposed at the shaft axis for rolling engagement with the cam 144 diametrically oppositely to the roller carried by the arm 141.

The clutch timing cam 144 is mounted on a shaft 151 journaled suitably in and through the side plates 101 of the frame 100. Mounted on the opposite frame projecting ends of the shaft 151 are bevel gears 152 and 152′, respectively, merely one of these gears, as 152, being fixed on the shaft 151, the other gear 152′ being provided for balancing purposes and hence revolving freely on the shaft 151. The gears 152 and 152′ have meshing engagement with a stationary bevel pinion 153, suitably provided on the housing carried hub 107, for effecting one revolution of the gears 152 on two revolutions of the shaft 98, hence the cam 144 revolves synchronously with or at the same speed as the driving ring gears F.

It will be seen that reciprocation of the clutch sleeve 118 is responsive to engagement of the rollers 143 with the cam 144. In such respect the working face of the cam 144 is divided into four quarters, one pair of opposite quarters being dwells concentric with the cam axis, and right angularly thereto one quarter is a rise and the opposite quarter is a fall. The springs 139 and 147 are under initial compression for causing the rollers 143 to hug the dwells of the cam, the clutch drum 118' carried by the sleeve 118 being then in neutral or disengaged position substantially equi-distant from the opposing clutch driving discs 116 and 126. When the rising portion of the cam 144 engages either of the rollers 143, the clutch drum 118' is correspondingly shifted alternately for engagement of its clutch discs, 119 or 120, with the clutch driving discs 116 and 126, respectively, the rise of the cam 144 being such as to effect further compression of the spring 139 or 147, as the case may be, for increasing the frictional cooperation between the clutching members.

Hence on rotation of the cam 144, the drum 118' is successively advanced from its neutral position into engagement of its rear disc 119 with the driving clutch disc 116 for a period of one-quarter revolution of the ring gears F, then returned to neutral position for the next quarter revolution of the gears F, then advanced for engagement of its front disc 120 with the driving clutch disc 126 for the succeeding quarter revolution of the gears F, and finally returned again to neutral position for the last quarter revolution of the gears F.

It is to be particularly observed that the clutch drum 118' is in permanent driving connection with the shaft C for actuation by the latter of the drum discs 119 and 120, at a speed synchronous with that of the clutch disc 116 or 126 at the particular moment of engagement therewith, thus eliminating clutch slip and shock of engagement therebetween.

The clutching mechanism M' is substantially in form and function similar to, although reversely arranged from, the mechanism M, hence further description thereof is omitted. However, for reasons presently appearing, the clutch timing cam 144' of the mechanism M' cooperating with the rear group II of the ring gears F and G is a quarter revolution in advance of the cam 144 of the mechanism M cooperating with the front group I of the ring gears F and G, it being borne in mind that in the present instance, the respective cams revolve in opposite directions, as indicated by the arrows in Figure 1. It follows that at the particular moment illustrated in the drawings, the cam 144' of the mechanism M' is disposed for forwardly shifting the clutch drum disc 119' into engagement with the clutch disc 116' of the particular pinion 115' actuatable by the front ring gear G of the rearward group II thereof, thereby effecting driving connection through the drum gear 121' and gear 36' between such particular gear G and the driven shaft C, the clutch disc 120' being then spaced from the disc 126' of the gear 127', as best seen in Figure 1.

In the use and operation of my invention, the housing A is suitably supported in cooperative relationship with a prime mover, as an automotive engine, or the like, for transmission of the engine power to the mechanism to be driven, as the rear axle of an automobile, the engine preferably being connected to the driving shaft B through the medium of the usual automotive clutch and a simple reversing mechanism adapted for effecting selectively merely a direct, neutral or reverse connection between the engine and the transmission shaft B.

Assuming the automobile at a standstill with the transmission disconnected from the engine and the several parts in their respective positions shown in the drawings, engagement of the engine with the shaft B will result initially in revolution of all the ring gears F in unison. At such moment the front gear F of the rear group II is disposed at its maximum leverage ratio with respect to its associated gear G, the latter in turn, by means of the clutching mechanism M' being operatively connected to the shaft C, as diagrammatically illustrated by the solid heavy line in Figure 10, which shaft C through the gears 19 and 39, actuates the socket 21 for thus transmitting the engine power to the apparatus to be driven, here assumed to be the rear-axle of the automobile, at a speed reduction in the ratio of 3:1, it being borne in mind that such maximum leverage position of the particular gear F is at mid-position of its working quadrant $d$ (Figure 11).

Continued revolution of the gears F causes the synchronously actuated rear cam 144' to disconnect the front gear G of the rear group II from the shaft C as the corresponding gear F reaches the end of its working quadrant, while simultaneously the front cam 144 acts to connect the rear gear G of the front group I to the shaft C by means of the gear engaged pinion 115, clutch disc 116, drum gear 121 and shaft carried gear 36, the corresponding gear F being then at the beginning of its working quadrant. In similar manner, successively, the rear gear G of the rear group II and the front gear G of the front group I are intermittently connected during their respective working periods with a shaft C, whereupon the cycle repeats itself for thus establishing a continuous flow of power from the driving shaft B to the driven shaft C.

Meanwhile the governor mechanism K which is directly responsive to engine speed through the shaft B, forward ring gear F, shaft D, gears 41 and 62 and pinion 61, becomes operative for shifting the frame H at an engine speed determined initially, by the strength of the weight connecting springs 69 and subsequently, also by the shaft carried spring 77.

Thus, increased engine speed is reflected in upward shifting actuation of the frame H and its carried fulcrum shafts L, for hence decreasing the leverage arm ratio of each pair of connected ring gears F and G. It is to be noted, however, that such diminution in leverage arm ratio is merely indirectly responsive to vehicle speed; the engine speed must again increase before the governor K can effect further decrement of the leverage arm ratio. Such decrements have a cumulatively multiplying effect on the speed reduction ratio until at a suitable speed predetermined by the governor construction, for example at 25 M. P. H., the weights 68 are thrown widely apart and the transmission is locked in high speed position at a 1:1 speed ratio as described.

It will be seen that the speed ratio regulation is independent of the power output of the engine, and is as effectively operable for high-speed regulation when descending a steep hill with the engine idling, as it is operable for low speed regulation when ascending a steep hill under full power of the engine. A highly efficient and very rapid acceleration may thus be obtained with ease and facility from a standing start of an automobile equipped with my invention.

It will also be seen that the speed ratio regulation is effected below a certain critical engine speed, assumed here as corresponding to a car speed of 25 M. P. H., but such critical speed may have any desired value at the option of the person constructing the device.

Hence a nicely proportioned braking effect may be obtained by running the car against the compression of the engine, such braking effect acting in the usual manner at high car speed, but being more and more effective with multiplied cumulative effect as the engine speed diminishes below the critical car-speed, thus a very powerful final braking effect is secured with a high degree of safety in operation of the automobile.

The uniformly varying speed regulation of the transmission is also highly effective for comfortable operation of the car and for employment of the engine at maximum efficiency; the automatic regulation of the speed changes is also conducive to the safe and economical operation of the automobile in traffic, merely the manipulation of the engine throttle sufficing equally for low speed operation in congested traffic or for a "flashy get away" or "sprint" when conditions allow. If the usual "foot throttle" control is employed, it will be further seen that the driver may at all times safely control the car with both hands on the steering wheel.

For extremely heavy pulling or other abnormal conditions of car operation, it may be desirable to render the automatic speed regulation mechanism temporarily inoperative, for which purpose the stop 89 may be shifted upwardly for locking the governor mechanism K in low speed position or selectively intermediately low and high speed positions as may best serve the purpose, the stop plunger spring 93 serving to restore the automatic regulation of the transmission when the emergency has passed.

While I have shown two groups I and II of the ring gears F and G, it will be understood that more than two such groups of ring gears may be employed for effecting an overlapping transmission of power from the driving shaft B to the driven shaft C; also the ring gears F and G may be supported on three equally spaced shafts including the shafts B and C, and in fact the number of such shafts may be increased as desired or most suitable for the purpose; furthermore, the shaft carried idling pinions may be replaced with toothless drums or so called traction wheels, the ring gears having circumferential flanges of pitch-line diameter cooperating with complementary flanges on the traction wheels.

It will be seen that my invention accomplishes its objects in a highly practical and efficient manner, and it will be understood that other changes and modifications in the form, construction, arrangement and combination of parts may be made and substituted for those herein shown and described without departing from the nature and principle of my invention.

I claim:

1. In speed changing apparatus, the combination, with driving and driven shafts, of unyieldingly connected driving and driven elements, the driving element having permanent connection with the driving shaft, said elements having concurrent periods of revolution at relatively variable angular velocities, and means for alternately connecting and disconnecting the driven element with and from the driven shaft during respective predetermined periods of a revolution of the driving element.

2. In a speed changing apparatus, the combination, with driving and driven shafts, of cooperating rotatory driving and driven elements, said driving elements having permanent connection with the driving shaft, means for effecting permanent unyielding connection with and between said elements for actuation thereof with concurrent periods of revolution at relatively variable angular velocities, and means for alternately connecting and disconnecting the driven element with and from the driven shaft during respective predetermined periods of a revolution of the driving element.

3. In speed changing apparatus, the combination, with driving and driven shafts of axially aligned rotatory driving and driven elements, said driving element having permanent connection with the driving shaft means including a rotatory lever having permanent connection with and between said elements for actuation thereof with concurrent periods of revolution at relatively variable angular velocities, and means for alternately connecting and disconnecting the driven element with and from the driven shaft during respective predetermined periods of a revolution of the driving element.

4. In a speed changing apparatus, the combination with driving and driven shafts of axially aligned driving and driven elements, said driving element having permanent connection with the driving shaft, a rotatory lever including diametrically opposite rigidly connected arms each engaging a respective element for effecting a permanent connection with and between said elements for actuation thereof with concurrent periods of revolution at relatively variable angular velocities, and means for alternately connecting and disconnecting the driven element with and from the driven shaft during respective predetermined periods of a revolution of the driving element.

5. In a speed changing apparatus, the combination, with driving and driven shafts of axially aligned driving and driven elements, said driving element having permanent connection with the driving shaft, a rotatory lever including diametrically opposite rigidly connected arms, cross-head means for engaging said opposite arms, each with a respective element for effecting a permanent connection with and between said elements for actuation thereof with concurrent periods of revolution at relatively variable angular velocities, and means for alternately connecting and disconnecting the driven element with and from the driven shaft during respective predetermined periods of a revolution of the driving element.

6. In a speed changing apparatus, the combination, with driving and driven shafts, of rotarily connected driving and driven elements, said driving element having permanent connection with the driving shaft, said elements having concurrent periods of revolution at relatively variable angular velocities, and means including a supplemental rotatory member and clutching mechanism carried thereby for alternately connecting and disconnecting the driven element with the driven shaft during respective predetermined periods of a revolution of the driving element.

7. In an automotive transmission, the combination with driving and driven shafts, of a series of pairs of revolvable driving and driven annular elements, said driving elements being connected with the driving shaft for unison actuation therewith, a series of pivotally aligned independently rotatable fulcrumed members each cooperating with a respective pair of driving and driven elements for effecting continuously variable permanent driving connection therebetween, and means including a series of supplemental rotatory members, each permanently connected with a respective driven element and clutching mechanism associated therewith for intermittently connecting the driven elements successively with the driven shaft for effecting substantially uniform rotation thereof.

8. In an automotive transmission, the combination with driving and driven shafts, of a series of pairs of revolvable driving and driven annular elements, said driving elements being connected with the driving shaft for unison actuation therewith, a series of pivotally aligned independently rotatable fulcrumed members each cooperating with a respective pair of driving and driven elements for effecting continuously variable permanent driving connection therebetween, means including a series of supplemental rotatory members, each permanently connected with a respective driven element and clutching mechanism associated therewith for intermittently connecting the driven elements successively with the driven shaft, and means for actuating said clutching mechanism in synchronism with said driving elements for effecting substantially uniform rotation of the driven shaft.

9. In an automotive transmission, the combination with driving and driven shafts, of a series of pairs of revolvable driving and driven annular elements, said driving elements being connected with the driving shaft for unison actuation therewith, a series of pivotally aligned independently rotatable fulcrumed members each cooperating with a respective pair of driving and driven elements for effecting continuously variable permanent driving connection therebetween, a series of cooperating pairs of supplemental rotatory clutching members, one member of each pair having permanent connection with a respective driven element, the other members of said pairs having permanent connection with the driven shaft for unison actuation therewith, and means operable in synchronism with the driving elements for engaging successive pairs of said clutching members when the same are rotating at substantially equal angular velocities.

10. In an automotive transmission, the combination with driving and driven shafts, of a series of pairs of revolvable driving and driven annular elements, said driving elements being connected with the driving shaft for unison actuation therewith, a series of pivotally aligned independently rotatable fulcrumed members each cooperating with a respective pair of driving and driven elements for effecting continuously variable permanent driving connection therebetween, means including a series of supplemental rotatory members, each permanently connected with a respective driven element and clutching mechanism associated therewith for intermittently connecting the driven elements successively with the driven shaft for effecting substantially uniform rotation thereof, a shiftable fulcrum frame for supporting said fulcrumed members, and governor operated mechanism actuatable responsively to driving shaft speed for shifting said fulcrum frame for effecting automatically variable speed transmission between the driving and driven shafts.

11. In an automotive transmission, the combination with driving and driven shafts, of a series of pairs of revolvable driving and driven annular elements, said driving elements being connected with the driving shaft for unison actuation therewith, a series of pivotally aligned independently rotatable fulcrumed members each cooperating with a respective pair of driving and driven elements for effecting continuously variable permanent driving connection therebetween, means including a series of supplemental rotatory members, each permanently connected with a respective driven element and clutching mechanism associated therewith for intermittently connecting the driven elements successively with the driven shaft for effecting substantially uniform rotation thereof, a shiftable fulcrum frame for supporting said fulcrumed members, and governor operated mechanism actuatable responsively to driving shaft speed for shifting said fulcrum frame for effecting automatically variable speed transmission between the driving and driven shafts, said governor operated mechanism including toggle linkage members extensible at extreme positions of the governor for locking the fulcrum frame in respective correspondingly shifted position.

12. In a speed changing apparatus, the combination, with driving and driven shafts, of a rotatory driving element having permanent connection with the driving shaft, a driven element axially aligned with the driving element, a fulcrumed member providing a permanent rotatory lever connection between said driving and driven elements and having its center of revolution eccentrically disposed relatively to and in a diametrical plane of the center of revolution of said elements for effecting concurrent periods of revolution thereof at relatively variable angular velocities, and means for connecting said driven element with the driven shaft during a quadrant of revolution of the driving element bisected by the said plane of the center of the fulcrumed member.

13. In a speed changing apparatus, the combination, with driving and driven shafts, of a rotatory driving element having permanent connection with the driving shaft, a rotary driven element axially aligned with the driving element, a fulcrumed member providing a permanent rotatory lever connection between said driving and driven elements, means for shifting the center of revolution of said fulcrumed member in a diametrical plane of said rotatory elements for effecting concurrent periods of revolution thereof at continuously variable relative angular velocities, and means for connecting said driven element with the driven shaft during a quadrant of revolution of the driving element bisected by the plane of center shifting movement of the fulcrumed member.

In testimony whereof, I affix my signature.
VERNON KINSER.